United States Patent [19]
Duran

[11] Patent Number: 4,464,090
[45] Date of Patent: Aug. 7, 1984

[54] CAPTIVE PANEL FASTENERS

[75] Inventor: John A. Duran, Glendora, Calif.

[73] Assignee: Avibank Mfg., Inc., Burbank, Calif.

[21] Appl. No.: 410,068

[22] Filed: Aug. 20, 1982

[51] Int. Cl.$^3$ .............................................. F16B 43/00
[52] U.S. Cl. .................................... 411/103; 411/353; 411/105; 411/517; 411/530
[58] Field of Search ................ 411/103, 105, 107, 108, 411/111, 337, 352, 353, 357, 418, 517, 529, 530; 24/221 R, 221 A

[56] References Cited

U.S. PATENT DOCUMENTS

| | | | |
|---|---|---|---|
| 2,729,126 | 1/1956 | Stanton, Jr. et al. | 411/353 |
| 2,949,143 | 8/1960 | Shur | 411/353 |
| 3,062,253 | 11/1962 | Millheiser | 411/353 |
| 3,295,578 | 1/1967 | Maloof | 411/105 |
| 4,069,855 | 1/1978 | Petroshanoff | 411/105 |
| 4,324,517 | 4/1982 | Dey | 411/353 |

Primary Examiner—Thomas J. Holko
Assistant Examiner—Neill Wilson
Attorney, Agent, or Firm—Poms, Smith, Lande & Rose

[57] ABSTRACT

A captive panel fastener having an enlarged head and a threaded shank with a pair of slots extending longitudinally along the outer periphery of said shank through the threads thereon. A C-shaped ring is trapped in a grommet assembly and has a pair of inwardly extending ends riding in the slots. In this manner, when the grommet assembly is installed in an aperture, such as in the skin of an aircraft panel, the fastener can be pushed between positions whereby in a first position the grommet assembly and C-ring are at one end of the shank holding the head and shank outwardly from the aircraft panel and, in a second position, the C-ring rides along the slots and abuts against the head so that the remaining threaded shaft can extend through the aperture and a nut threaded thereon securing the fastener to the panel.

16 Claims, 18 Drawing Figures

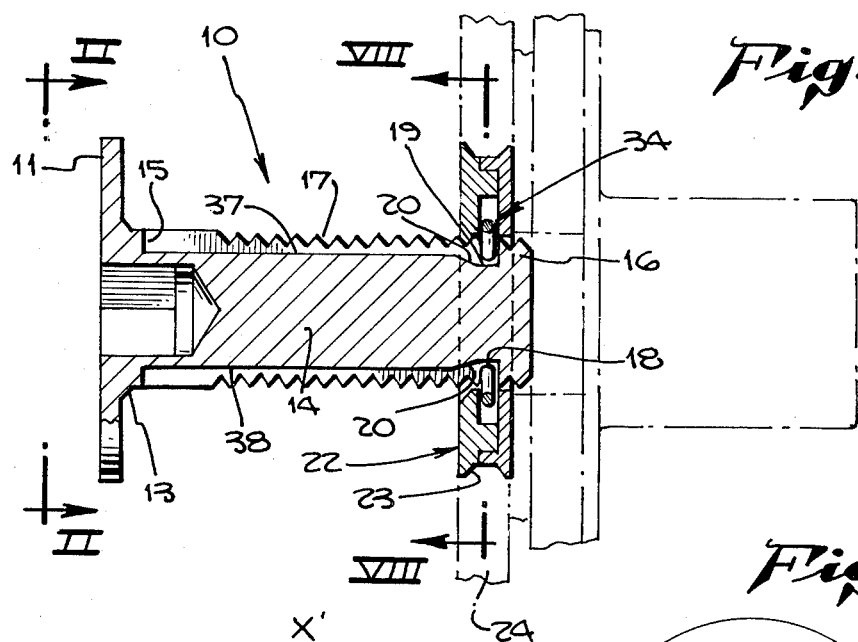
Fig. 1.
Fig. 2.
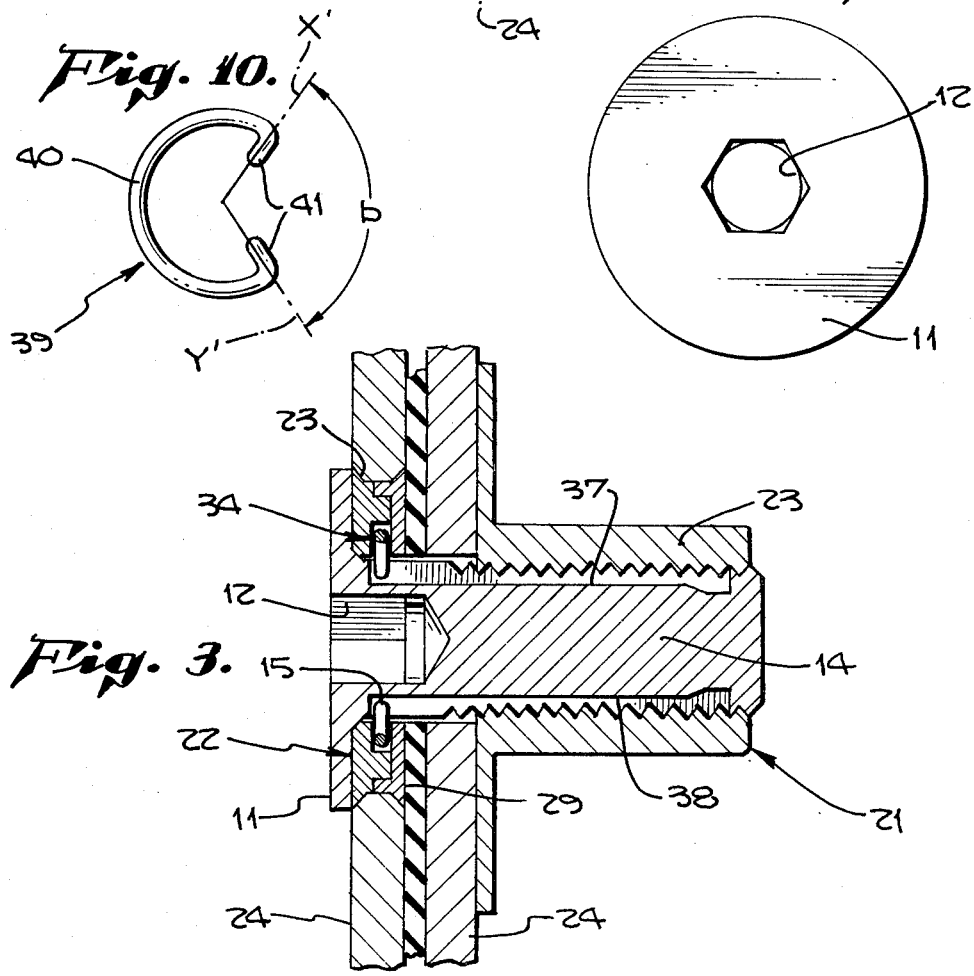
Fig. 10.
Fig. 3.

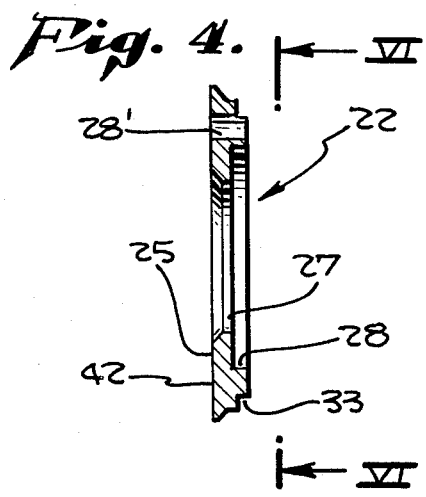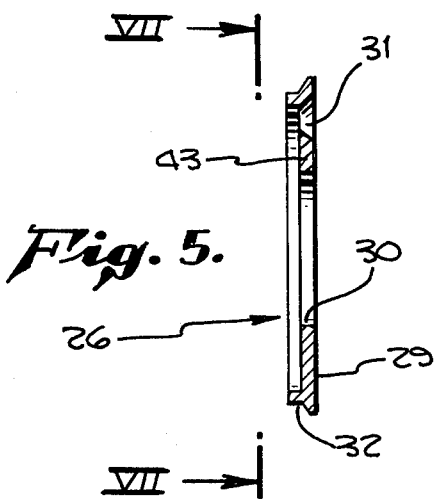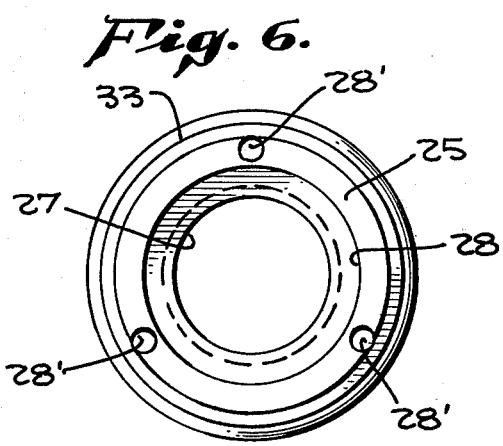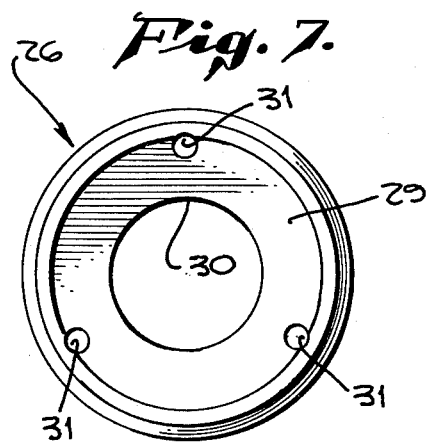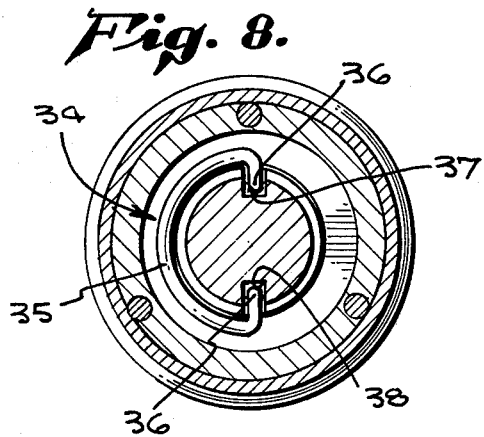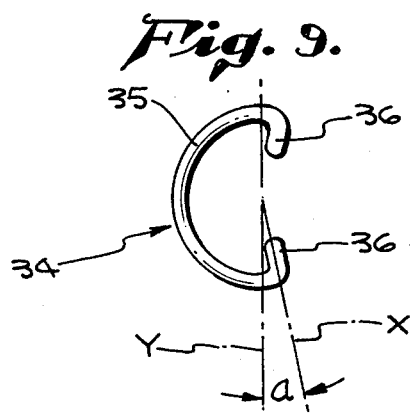

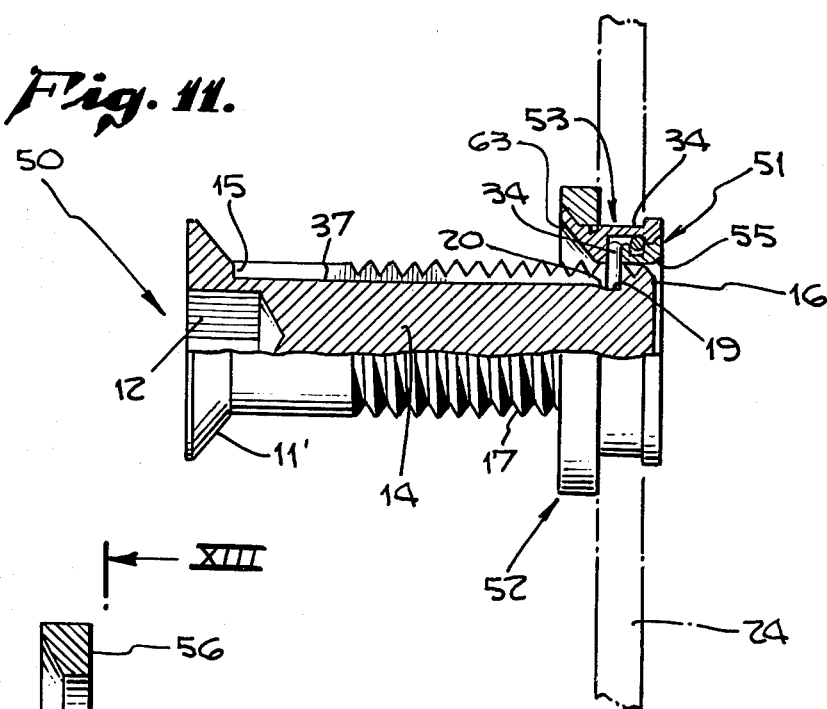
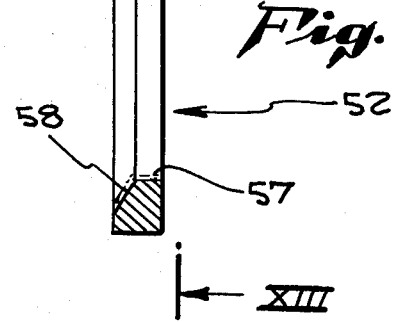
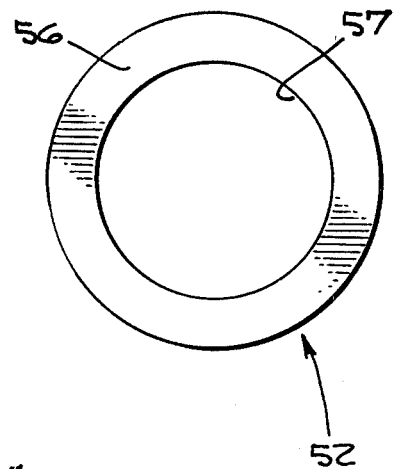
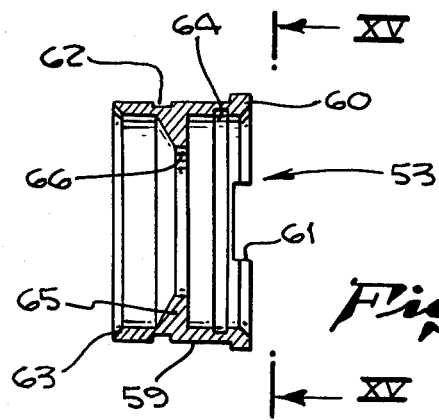

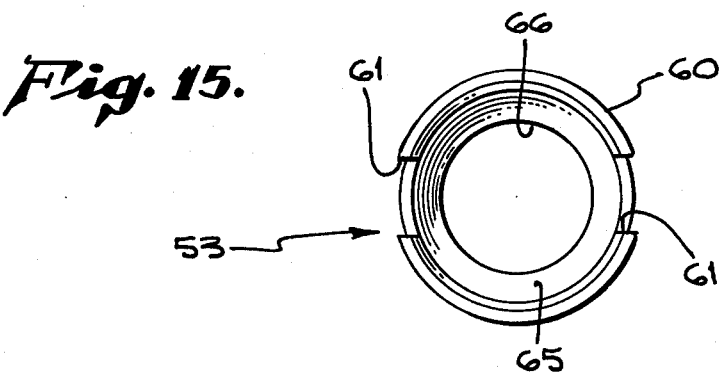
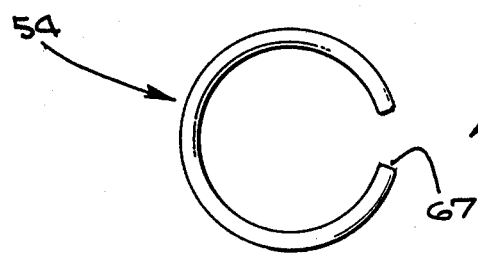
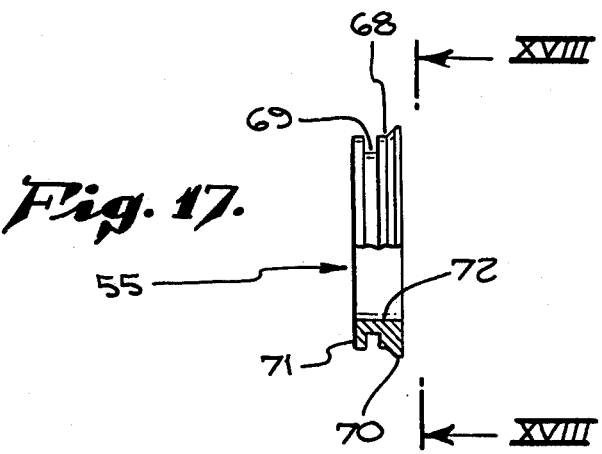
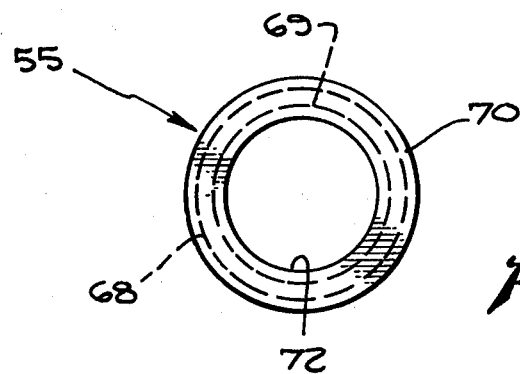

CAPTIVE PANEL FASTENERS

BACKGROUND OF THE INVENTION

1. Field of the Invention

The invention relates to captive panel fasteners; and, particularly to an improved fastener for aircraft for holding the head and shank away from an aperture in the aircraft in a first position while permitting the fastener to be pushed to a second position where the head abuts against the aircraft and the shank enters the aperture in the aircraft.

2. Description of the Prior Art

Panel fasteners for aircraft are well known. Usually, such fasteners secure a panel to an aircraft by insertion through an opening in the aircraft panel and a nut attached to the panel on the blind side is threaded to the shaft of the fastener, the enlarged head abutting against the panel on the access side thereof. Means have been suggested in the prior art for preventing the fastener from becoming disengaged from the panel when the fastener is threaded out of engagement with the nut. For example, in U.S. Pat. No. 4,069,855 to Petroshanoff, the fastener is captivated to the panel by a retaining ring which includes integral tabs that ride within cross-channels and an installation slot extending intermediate the ends of the fastener. However, in this arrangement, the ring eats or bites into the threads of the shank wearing out the same and destroying its utility. It may then have to be drilled out of the panel aperture resulting in lost man hours.

There is thus a need for a captive panel fastener which can hold the head and shank of the fastener to the panel prior to installation while permitting pushing of the head and shank into the aperture to engage a nut without damaging the threads of the shank.

SUMMARY OF THE INVENTION

It is an object of this invention to provide an improved captive panel fastener which can hold the head and shank away from an aperture in an aircraft panel or the like prior to installation.

It is another object of this invention to carry out the foregoing object while permitting the fastener to be pushed through the aperture until the shank engages a nut on the blind side thereof.

It is a further object of this invention to carry out the foregoing objects without damaging or engaging the threads of the shank.

These and other objects are preferably accomplished by providing a captive panel fastener having an enlarged head and a threaded shank with a pair of slots extending longitudinally along the outer periphery of said shank through the threads thereof. A C-shaped ring is trapped in a grommet assembly and has a pair of inwardly extending ends riding in the slots. In this manner, when the grommet assembly is installed in an aperture, such as in the skin or an aircraft panel, the fastener can be pushed between positions whereby, in a first position, the grommet assembly and C-ring are at one end of the shank holding the head and shank outwardly from the aircraft panel and, in a second position, the C-ring rides along the slots and abuts against the head so that the remaining threaded shaft can extend through the aperture and a nut threaded thereon securing the fastener to the panel.

BRIEF DESCRIPTION OF THE DRAWING

FIG. 1 is a vertical sectional view of a fastener in accordance with the invention installed in an aircraft panel;

FIG. 2 is a view taken along lines II—II of FIG. 1;

FIG. 3 is a view similar to FIG. 1 showing the final installation position of the fastener;

FIG. 4 is a side view of one half of one of the elements of the fastener of FIG. 1;

FIG. 5 is a side view of the second half of one of the elements of the fastener of FIG. 1;

FIG. 6 is a view taken along lines VI—VI of FIG. 4;

FIG. 7 is a view taken along lines VII—VII of FIG. 5;

FIG. 8 is a view taken along lines VIII—VIII of FIG. 1;

FIG. 9 is a plan view of the ring element alone of the fastener of FIG. 1;

FIG. 10 is a plan view of an alternate ring element;

FIG. 11 is a view similar to FIG. 1 showing an alternate embodiment of the invention;

FIG. 12 is a cross-section view of one element of the assembly of FIG. 11;

FIG. 13 is a view taken along lines XIII—XIII of FIG. 12;

FIG. 14 is a cross-sectional view of another element of the assembly of FIG. 11;

FIG. 15 is a view taken along lines XV—XV of FIG. 14;

FIG. 16 is a plan view of another element of the assembly of FIG. 11;

FIG. 17 is a cross-sectional view of still another element of the assembly of FIG. 11; and FIG. 18 is a view taken along lines XVIII—XVIII of FIG. 17.

DESCRIPTION OF THE PREFERRED EMBODIMENTS

Referring now to FIG. 1 of the drawing, the fastener 10 in accordance with the invention is shown having an enlarged head 11 at one end having a countersunk hexagonally shapped cavity 12 (see also FIG. 2) adopted to receive therein a hexagonally shaped drive tool (not shown) such as a screw-driver, allen wrench, or the like.

Head 11 is generally flat having a tapered portion 13 on its undersurface leading to an integral shank portion 14. A shoulder 15 is formed at the intersection of shank portion 14 and tapered portion 13. Shank portion 14 terminates at a blunt-nosed leading end 16 and is threaded at threads 17 between shoulder 15 and 16. A shoulder 18 is provided on the underside of end 16 at the terminal ends of threads 17. As can be seen in FIG. 1, a reduced portion 19 is provided on shank portion 14 adjacent shoulder 18 tapering outwardly at taper 20 toward shank portion 14. Blunt-nosed end 16 eases entry of the fastener 10 into a self-locking nut 21 (see FIG. 3) attached to the structure of the aircraft which threadably engages shank portion 14 to fasten the same to the aircraft panel as is well known in the art.

A grommet 22 (FIG. 1) is mounted into an opening 23 in the skin 24 of an aircraft panel or the like. As shown in FIGS. 4 through 7, grommet 22 may be comprised of two mating parts of a suitable material, such as stainless steel, a first main grommet portion 25 (FIG. 4) and a mating retainer 26 (FIG. 5). Main grommet portion 25 is generally an annular ring and includes a central opening 27 and a plurality of protrusions 28, such as three, extending from one side thereof (see also FIG. 6) providing threaded openings 28$^1$ through grommet portion 25. Retainer portion 26 includes a main generally annular body portion 29 surrounding a central opening 30 and a plurality of spaced countersunk openings 31, such as three, adapted to align with openings 28$^1$ through protrusions 28 when assembled. An annular lip 32 extends about retainer portion 26 and is adapted to frictionally fit over the outer cylindrical surface 33 (FIG. 4) of grommet portion 25 to form the grommet 22 of FIG. 1.

As shown in FIGS. 8 and 9, a spring in the form of a C-shaped ring 35 fits into the grommet 22, as will be discussed, and includes a main arcuate body portion 35 terminating in a pair of inwardly extending ends or legs 36. Legs 36 are adapted to ride in a pair of spaced longitudinal slots 37, 38 (see particularly FIG. 8) extending along shank portion 14 of the fastener 10. Legs 36 may have their central longitudinal axes x making an angle a of about 10° with line y passing between the inner longitudinal faces of legs 36 as shown. Alternatively, the legs of the ring may be angled differently as shown in FIG. 10 wherein a modification of the substantially semi-circular ring 36 of FIG. 9 is shown. Thus, ring 39 of FIG. 10 also has a main arcuate body portion 40 terminating in inwardly extending ends or legs 41. An angle b of approximately 110° may be provided between lines x$^1$ and y$^1$ passing through the longitudinal axes of legs 41.

In both rings 34 and 39, the terminal ends of legs 36, 41 may be blunted and both rings 34 and 39 are mounted in the fastener 10 similarly, as will be discussed, and ride in slots 37, 38 as shown in FIG. 8. Thus, only the assembly and function of ring 34 will be described but it is to be understood that such discussion is also applicable to ring 39 of FIG. 10. However, the angularity of slots 37, 38 may be varied to accommodate the angularity of legs 41 of ring 40. In any event, it is obvious that the dimensions and configuration of rings 34 and 40 and the angularity of their respective legs may be varied with the depth and angularity of the receiving slots 37, 38 also varied to accommodate the same.

In assembling the ring 36 of FIG. 9 to the retainer and grommet portions of FIGS. 4 and 5, grommet portion 25 is inserted into opening 23 in the aircraft skin 24 from the left side thereof in FIG. 1. The face 42 (FIG. 4) of grommet portion 25 is disposed away from aircraft skin 24.

The threaded shank portion 14 is now inserted through opening 27 in grommet portion 25, from the right in FIG. 1, and ring 34 placed thereof so that legs 36 enter slots 37, 38 as shown in FIG. 8.

Retainer portion 26 is now fit onto grommet portion 25 from the other side of the aircraft skin 24 with face 43 (FIG. 5) thereof disposed away from skin 24. The openings 28, 31 line up and screws are inserted into openings 31 and threaded into openings 28 to secure the retainer portion 26 to the grommet portion 25 thereby both sandwiching panel or skin 24 therebetween and securely holding ring 34 within grommet 24.

Although a specific type of grommet assembly has been discussed, obviously other grommet arrangements may be used as long as it retains the ring 34 in position in the aircraft skin and as will be discussed further.

Thus, it can be seen in FIG. 1 that the grommet 22 serves to retain ring 34 in a position whereby the shank portion 14 and head 11 of the fastener 10 extends away from the aircraft panel 24 at the same time the fastener 10 is captivated in the panel 24. In this manner, the fastener 10 cannot become displaced from the panel after it is disengaged from the nut since the legs of the retaining ring 34 do not engage the threads along shank portion 14 and cannot erode or eat away the threads. The final installed position of the fastener 10 is shown in FIG. 3 wherein the fastener 10 has been pushed or moved to the right in FIG. 1 (to the FIG. 3 position) into threading engagement with the self-locking nut with ring 34 moving along the slot in shank position 14 until it abuts against shoulder 15.

An alternate embodiment of the invention is illustrated in FIGS. 11 through 18. In this embodiment, the basic concept of the rings 34 and 39 functioning to hold the fastener in the FIG. 1 and FIG. 3 positions remains the same but the method and apparatus for installing the fastener to the panel differs.

Thus, as shown in FIG. 11 wherein like numerals refer to like parts of the embodiment of FIGS. 1 to 10, the captive panel fastener 50 includes an enlarged head 11$^1$ (slightly different from head 11 of the FIG. 1 embodiment) held outwardly from panel 24 by a grommet assembly 51.

Grommet assembly 51 is comprised of four elements, a retainer or spacer 52 (FIGS. 12 and 13), a grommet 53 (FIGS. 14 and 15), a split retaining ring 54 (FIG. 16 and a plug 55 (FIGS. 17 and 18).

As shown in FIGS. 12 and 13, retainer 52 is annular ring 56 having a central opening 57. As seen in FIG. 12, one face of ring 56 tapers at tapered portion 58 into opening 57.

As shown in FIGS. 14 and 15, grommet 53 has a generally tubular body portion 59 having an annular lip 60 (see particularly FIG. 15) with cut-out sections 61 (see also FIG. 14). Body portion 59 includes an annular groove 62 and its outer peripheral end terminates in an outwardly tapering end 63. Groove 62 is an undercut for reasons to be discussed further below. Body portion 59 also includes an inner annular groove 64 and an inwardly extending generally trapezoidal-shaped extension portion 65 defining a narrowed opening 66.

Ring 54 of FIG. 16 is generally circular in crosssection and split to form opening 67.

The plug 55 of FIGS. 17 and 18 includes a generally cylindrical main body portion 68 having an annular outer peripheral groove 69 and an outer flared lip 70 at one end and a generally flat portion 71 at its other end. Opening 72 extends through plug 55.

Referring once again to FIG. 11, an opening or hole 19 is first drilled in panel 24. Grommet 53 of FIGS. 14 and 15 is then installed in opening 19 in panel 24 in the position shown in FIG. 11. The spacer 52 is now installed over the groove 62 of grommet 53 and end 63 is swaged up against the tapered side 58 of spacer 52 as shown in FIG. 11. Thus, the spacer 52 is used to accommodate the various thicknesses of the panels 24 in which the assembly of FIG. 11 is installed. However, in certain assemblies where the panel is of sufficient thickness, spacer 52 is not necessary and end 63 may be swaged directly up against the panel 24. Retaining ring 54 is inserted into groove 69 (FIG. 17) of plug 55. Plug 55 of FIGS. 17 and 18, with ring 54 in position, is now installed in the groove 64 of body portion 59 of grommet 53, as shown in FIG. 11, by pushing it into grommet 53 with lip 60 of grommet 53 abutting against tapered lip 70 of plug 55.

It can be seen in FIG. 11 that, in such assembly, portion 65 of grommet 53 abuts against one side of ring 34 while portion 71 of plug 55 abuts against the other side of ring 34 thereby trapping ring 16 therebetween. This arrangement operates exactly as the FIG. 1 embodiment holding the bolt either outwardly extending from panel 24, as illustrated in FIG. 1 and 11, or inwardly extending as discussed hereinabove with respect to FIG. 3.

The assembly of FIG. 11 can be quickly and easily removed by use of a tool (not shown) which grabs the two opposite sides of plug 55, at lip 70, and permits plug 55 to be pulled out of engagement with grommet 53. The bolt (head 11$^1$ and shank 14) may now be pushed forward to the FIG. 3 position and ring 34 is removed. The bolt may also be removed.

Although the grommet, spacer and plug may be made of any suitable materials, they are preferably made of stainless steel. The split ring 54 may be of stainless steel wire.

In certain circumstances, the grommet 53 may be broken or it is otherwise necessary to remove the assembly. Thus, referring to FIG. 11, the bolt 14 is shifted or pushed to the right and C-shaped wire removed so bolt 14 can be removed. The grommet 53 may now be drilled out from the access side (to the left of panel 24 in FIG. 11) until the drill reaches undercut 62. The grommet 53 severs there and the rest of grommet 53 can be pushed out without destroying hole 19.

In summary, the ring 34 (and, of course, ring 39 of FIG. 10) also functions to hold the fasteners of FIGS. 1 and 11 in the respective FIG. 1 or FIG. 11 position when it is pulled out of the aperture in the aircraft skin. The nut is engaged by pushing the fastener to the right in FIGS. 1 and 11 to the final installed FIG. 3 position.

It can also be seen that the retaining ring, either ring 34 or 39, performs two functions: it prevents the bolt 14 from coming out of the grommet and/or panel; and, at the same time, it traps the bolt 14 so it remains in the out position shown in FIG. 1. This is of course accomplished by means of the two slots 37, 28 and the legs 41 or 36. The slots 37, 38 have a tapered or reduced section 19 at the end of the bolt 14 which allows the ring 34 or 39 to grab or bite down and maintain the bolt 14 in the FIG. 1 position.

I claim:

1. In a captive panel fastener comprising a threaded shank portion, an enlarged head at one end of said shank portion, the improvement which comprises:
    said retaining member including a grommet assembly trapping a generally C-shaped spring ring therein, said ring adapted to rotate together with said shank portion and having a main arcuate body portion terminating in inwardly extending ends; and
    said shank portion having at least a pair of longitudinally extending slots receiving therein the ends of said ring therein whereby, when said ring is at the terminal end of said shank portion, the remainder of said shank portion and said head extend away from said ring, and when the ends of said ring are moved axially along said shank portion in said slots, said ring abuts against said head with the remaining portion of said shank portion extending away from said head and said ring; and
    said shank portion having reduced section means of lesser diameter than the major diameter of said shank portion through said slots at the terminal end of said shank portion configured to receive said ring therein thereby allowing the ring to grab or bite down within said reduced section means to maintain said shank portion in a position extending outwardly from said grommet assembly.

2. In the fastener of claim 1 wherein said grommet assembly is comprised of a retainer portion and a grommet portion, said retainer portion and said grommet portion forming an annular member trapping said ring therebetween, and a plurality of aligned holes in said grommet portion and said retainer portion for receiving fastening means therein to secure said retainer portion to said annular portion.

3. In the fastener of claim 1 wherein the ends of said ring curve slightly inwardly toward the interior of said main arcuate body portion.

4. In the fastener of claim 3 wherein said ends make an angle of about 10° between a line passing longitudinally through the central axis of one of said ends and tangentially along the inside of the other of said ends and a line passing tangentially along the inside of both of said ends.

5. In the fastener of claim 3 wherein said ends make an angle of about 110° between a pair of lines extending axially through each of said ends.

6. In the fastener of claim 1 wherein said grommet assembly is comprised of a plug and a grommet, said grommet having a protruding portion abutting against one side of said ring and said plug having one face thereof abutting against the other side of said ring.

7. In the fastener of claim 6 wherein said plug is generally cylindrical and includes an annular groove on the outer surface thereof, and a split resilient ring disposed in said annular groove.

8. In the fastener of claim 7 including a spacer surrounding said grommet, said grommet having an annular portion thereon abutting against said spacer.

9. In a captive panel fastener assembly extending through an aperture in the skin of an aircraft comprising a threaded shank portion, an enlarged head at one end of said shank portion on the access side of said skin, and a retaining member secured to said shank portion, the improvement which comprises:
    said retaining member including a grommet assembly sandwiching said panel surrounding said aperture therebetween and trapping therein a generally C-shaped spring ring, said ring adapted to rotate together with said shank portion and having a main arcuate body portion terminating in inwardly extending ends; and
    said shank portion having at least a pair of longitudinally extending slots receiving therein the ends of said ring therein whereby, when said ring is at the terminal and of said shank portion, the remainder of said shank portion and said head extend away from said ring trapped in said grommet mounted in said aperture, and when the ends of said ring are moved axially along said shank portion in said slots, said ring abuts against said head with the remaining portion of said shank portion extending away from said head and said ring through said aperture into the blind side of said skin and into threaded engagement with a nut secured to said skin on the blind side thereof, said shank portion having reduced section means of lesser diameter than the diameter of said shank portion through said slots at the terminal end of said shank portion configured to receive said ring therein thereby allowing the ring to grab or bite down within said reduced section means to maintain said shank portion in a position extending outwardly from said grommet assembly.

10. In the assembly of claim 9 wherein said grommet assembly is comprised of a retainer portion and a grommet portion, said retainer portion and said grommet portion forming an annular member sandwiching said skin therebetween and also trapping said ring therebetween, a plurality of aligned holes in said grommet portion and said retainer portion for receiving fastening means therein to secure said retainer portion to said annular portion thereby also sandwiching said skin therebetween.

11. In the assembly of claim 9 wherein the ends of said ring curve slightly inwardly toward the interior of said main arcuate body portion.

12. In the assembly of claim 11 wherein said ends make an angle of about 10° between a line passing longitudinally through the central axis of one of said ends and tangentially along the inside of the other of said ends and a line passing tangentially along the inside both of said ends.

13. In the assembly of claim 11 wherein said ends make an angle of about 110° between a pair of lines extending axially through each of said ends.

14. In the assembly of claim 9 wherein said grommet assembly is comprised of a plug and a grommet, said grommet having a protruding portion abutting against one side of said ring and said plug having one face thereof abutting against the other side of said ring.

15. In the assembly of claim 14 wherein said plug is generally cylindrical and includes an annular groove on the outer surface thereof, and a split resilient ring disposed in said annular groove holding said plug in said aperture.

16. In the assembly of claim 15 including a spacer surrounding said grommet abutting against one side of said pannel, said grommet having an annular portion thereof abutting against said spacer thereby holding said spacer in position abutting said panel.

* * * * *